United States Patent
Wallace

(10) Patent No.: US 11,365,057 B1
(45) Date of Patent: Jun. 21, 2022

(54) PARCEL SORTING DEVICE

(71) Applicant: HYTROL CONVEYOR COMPANY, INC., Jonesboro, AR (US)

(72) Inventor: Paul D. Wallace, Bono, AR (US)

(73) Assignee: HYTROL CONVEYOR COMPANY, INC., Jonesboro, AR (US)

( * ) Notice: Subject to any disclaimer, the term of this patent is extended or adjusted under 35 U.S.C. 154(b) by 0 days.

(21) Appl. No.: 17/204,702

(22) Filed: Mar. 17, 2021

Related U.S. Application Data

(63) Continuation-in-part of application No. 29/724,169, filed on Feb. 13, 2020, now Pat. No. Des. 936,327, and a continuation-in-part of application No. 29/724,223, filed on Feb. 13, 2020, now Pat. No. Des. 936,328.

(51) Int. Cl.
| | |
|---|---|
| B65G 47/14 | (2006.01) |
| B65G 25/04 | (2006.01) |
| B65G 47/46 | (2006.01) |
| B65G 17/06 | (2006.01) |
| B65G 47/84 | (2006.01) |

(52) U.S. Cl.
CPC ......... *B65G 17/065* (2013.01); *B65G 47/844* (2013.01); *B65G 2201/02* (2013.01)

(58) Field of Classification Search
CPC ...... B65G 17/065; B65G 25/04; B65G 47/14; B65G 47/46; B65G 47/47; B65G 47/844
USPC ............................ 198/370.02, 370.07, 750.3
See application file for complete search history.

(56) References Cited

U.S. PATENT DOCUMENTS

| | | | | |
|---|---|---|---|---|
| 4,846,247 A * | 7/1989 | Kessler | ...... | E06B 9/15 160/235 |
| 5,127,510 A * | 7/1992 | Cotter | ...... | B65G 47/844 198/370.02 |
| 5,996,772 A * | 12/1999 | Foster | ...... | B65G 25/065 198/750.3 |
| 6,814,216 B2 * | 11/2004 | Veit | ...... | B65G 47/844 198/370.02 |
| 6,860,376 B1 * | 3/2005 | Heit | ...... | B07C 5/362 198/370.02 |
| 7,510,072 B1 * | 3/2009 | Wilkens | ...... | B65G 25/065 198/750.3 |
| 7,556,141 B2 * | 7/2009 | Foster | ...... | B65G 25/065 198/750.1 |
| 7,926,646 B1 * | 4/2011 | Berthelsen | ...... | B65G 25/065 198/750.3 |

(Continued)

*Primary Examiner* — Douglas A Hess
(74) *Attorney, Agent, or Firm* — Schrantz Law Firm, PLLC; Stephen D. Schrantz

(57) ABSTRACT

A plurality of slats having a head and a tail form a conveyor system. A sorter travels laterally across the slat to divert parcel across the slat. Each of the slats has a front edge and a rear edge located longitudinally apart from each other. The front edge and the rear edge are located at different vertical heights to create overlap between adjacent slats. The lower edge positioned vertically below the upper edge has an upper surface that curves downward from the conveying surface to the lower edge. The upper edge positioned vertically above the lower edge has a lower surface that curves downward from the upper edge towards the lower edge. A retention lip extends upward between the lower edge and the conveying surface to trap articles within the retention curve between the retention lip and the conveying surface.

7 Claims, 10 Drawing Sheets

(56) References Cited

U.S. PATENT DOCUMENTS

| | | | | |
|---|---|---|---|---|
| 8,616,365 | B2* | 12/2013 | Berthelsen | B65G 25/065 |
| | | | | 198/750.3 |
| 8,708,636 | B2* | 4/2014 | Jackson | B65G 25/065 |
| | | | | 414/509 |
| 8,763,312 | B2* | 7/2014 | Carter | E04B 2/46 |
| | | | | 52/36.5 |
| 2020/0156874 | A1* | 5/2020 | Friend et al. | |
| 2021/0122579 | A1* | 4/2021 | Jackson et al. | |

* cited by examiner

PARCEL SORTING DEVICE

CROSS-REFERENCE TO RELATED APPLICATIONS

This application claims priority to and is a continuation in part of U.S. patent application Ser. No. 29/724,169 entitled "PARCEL SORTING DEVICE" that was filed on Feb. 13, 2020. This application claims priority to and is a continuation in part of U.S. patent application Ser. No. 29/724,223 entitled "PARCEL SORTING DEVICE" that was filed on Feb. 13, 2020.

STATEMENT REGARDING FEDERALLY SPONSORED RESEARCH OR DEVELOPMENT

Not Applicable.

REFERENCE TO A MICROFICHE APPENDIX

Not Applicable.

RESERVATION OF RIGHTS

A portion of the disclosure of this patent document contains material which is subject to intellectual property rights such as but not limited to copyright, trademark, and/or trade dress protection. The owner has no objection to the facsimile reproduction by anyone of the patent document or the patent disclosure as it appears in the Patent and Trademark Office patent files or records but otherwise reserves all rights whatsoever.

BACKGROUND OF THE INVENTION

1. Field of the Invention

The present invention is directed to conveyor systems, and more particularly, to a parcel sorting system. The present invention allows selective discharge of articles from the conveyor. Occasionally, articles, such as parcel, letters, envelopes, and packages, slide between slats of the conveyor. An article within the slats can damage the article, the conveyor, and cause other damage. The present invention reduces the likelihood of parcel from being positioned between the slats of the conveyor.

II. Description of the Known Art

Conveyor systems transport articles, including, but not limited to, goods, packages, cartons and other objects in all types of environments. Complex conveyor systems typically require several conveyor lines and lanes that cooperate with one another to transport or sort objects, as well as various peripheral devices that are associated with each conveyor lane (e.g., sensors, solenoids, motors, etc.).

Articles can slide between the slats of a conveyor system. These articles can then damage the conveyor system. Such damage could result in loss of goods, damaged goods, damaged conveyor, loss of operation time, etc. The present invention reduces the likelihood that articles can be lodged between the slats of the conveyor.

Sorting systems having diverter shoes are known in the art. However, such sorting systems do not provide the improved slat of the present invention. Therefore, improvements are needed for improved operation of the sorting system.

SUMMARY OF THE INVENTION

The parcel sorting device of the present invention provides a slat having a head, such as a front edge, and a tail, such as a rear edge. The slats are connected together to form the conveyor system. An upper surface of the slats forms a conveying surface for conveying articles from a first location to a second location. A sorter, including but not limited to a sliding shoe sorter, travels laterally across the slat to divert an article laterally across the slat.

The conveyor conveys articles of different sizes and weights via the slats. The conveyor provides a plurality of slats that are interconnected to form an endless web. An upper surface of the slats defines a conveying surface. A plurality of sliding shoes travel laterally along at least some of the slats to laterally displace articles from the conveying surface.

Each of the slats has an upper surface for conveying articles and a front edge and a rear edge. The front and rear edge are located longitudinally apart from each other. The sorter, such as a diverter shoe, transfers articles laterally across the slats. The front edge and the rear edge are located at different vertical heights to create overlapping of adjacent slats. Such overlap of the adjacent slats decreases the size of the gap between the slats. The front edge and the rear edge extend longitudinally from the conveying surface.

The upper surface of the slat extending longitudinally forward from the conveying surface curves downward to the front edge. The lower surface of the slat extending longitudinally forward from the rear edge curves downward towards the front edge. The curves may be reversed depending upon which edge, the front or rear, is positioned vertically above the other. The lower edge positioned vertically below the upper edge has an upper surface that curves downward from the conveying surface longitudinally to the lower edge. The upper edge positioned vertically above the lower edge has a lower surface that curves downward from the upper edge longitudinally towards the lower edge.

A retention lip positioned between the lower edge and the conveying surface extends upward. However, the retention lip is positioned below the upper edge. In one embodiment, the retention lip is positioned between the front edge and the conveying surface. The retention lip traps articles within the retention curve between the retention lip and the conveying surface.

It is an object of the present invention to convey articles along a conveyor.

Another object of the present invention is to reduce the number of articles that slip between the slats.

Another object of the present invention is to reduce damage to the conveyor.

Another object of the present invention is to reduce downtime of the conveyor.

Another object of the present invention is to convey a variety of articles.

In addition to the features and advantages of the parcel sorting device and system according to the present invention, further advantages thereof will be apparent from the following description in conjunction with the appended drawings.

Other objects, features, and advantages of the invention will be apparent from the following detailed description taken in connection with the accompanying drawings.

These and other objects of the invention will become more fully apparent as the description proceeds in the following specification and the attached drawings. These and other objects and advantages of the present invention, along with features of novelty appurtenant thereto, will appear or become apparent in the course of the following descriptive sections.

BRIEF DESCRIPTION OF THE DRAWINGS

In the following drawings, which form a part of the specification and which are to be construed in conjunction therewith, and in which like reference numerals have been employed throughout wherever possible to indicate like parts in the various views.

DETAILED DESCRIPTION

Figure 1:
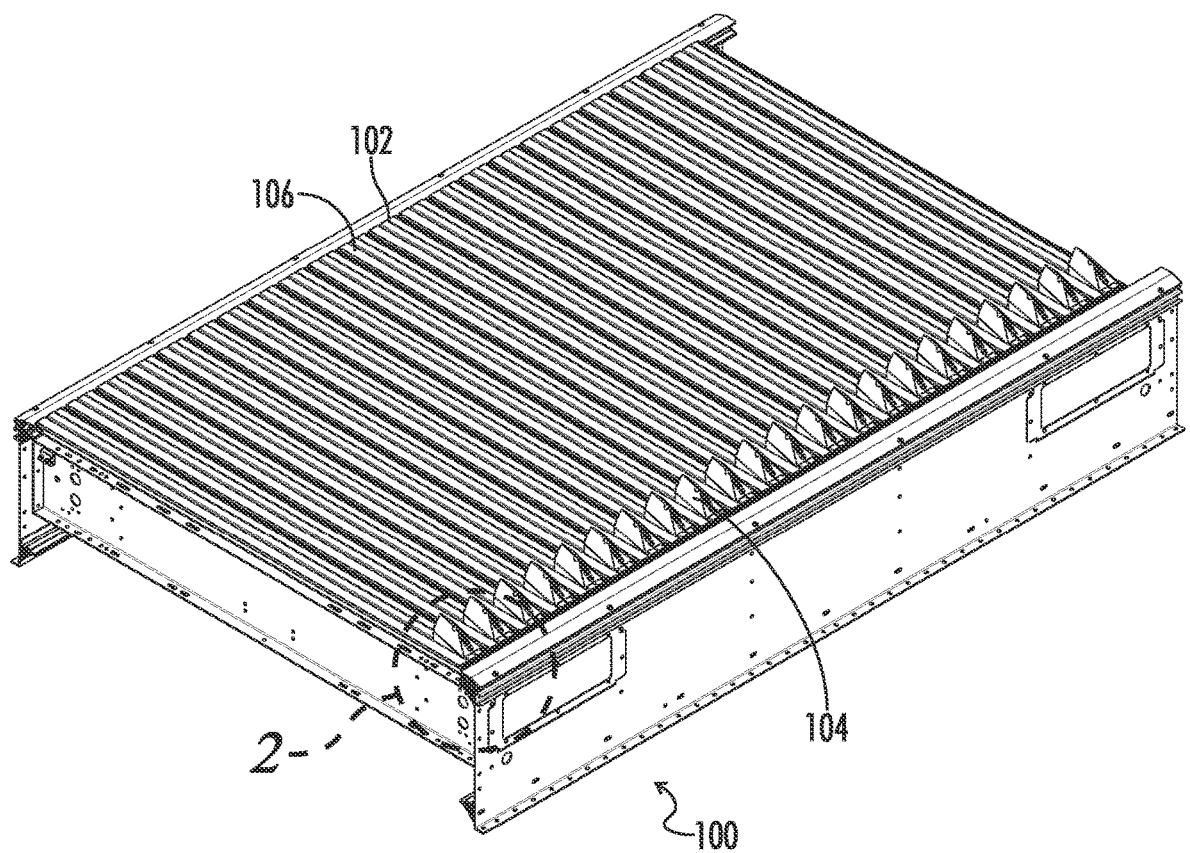
FIG. 1 is an environmental view showing one embodiment of the present invention.

The parcel sorting device of the present invention is generally shown as 100 in FIG. 1. The parcel sorting device operates with a conveyor 102. The conveyor 102 provides a plurality of slats having a head at the front edge and a tail at the rear edge. The slats are connected together to form the conveyor 102. An upper surface of the slats forms a conveying surface 106 for conveying articles, such as parcel, from a first location to a second location. A sorter 104, including but not limited to a sliding shoe sorter, travels laterally across the slat to divert articles across the slat.

The conveyor 102 conveys articles of different sizes and weights via the slats. The conveyor 102 provides a plurality of slats that are interconnected to form an endless web. An upper surface of the slats defines the conveying surface. A plurality of sliding shoes travel laterally along at least some of the slats to laterally displace the articles from the conveying surface.

Figure 2:
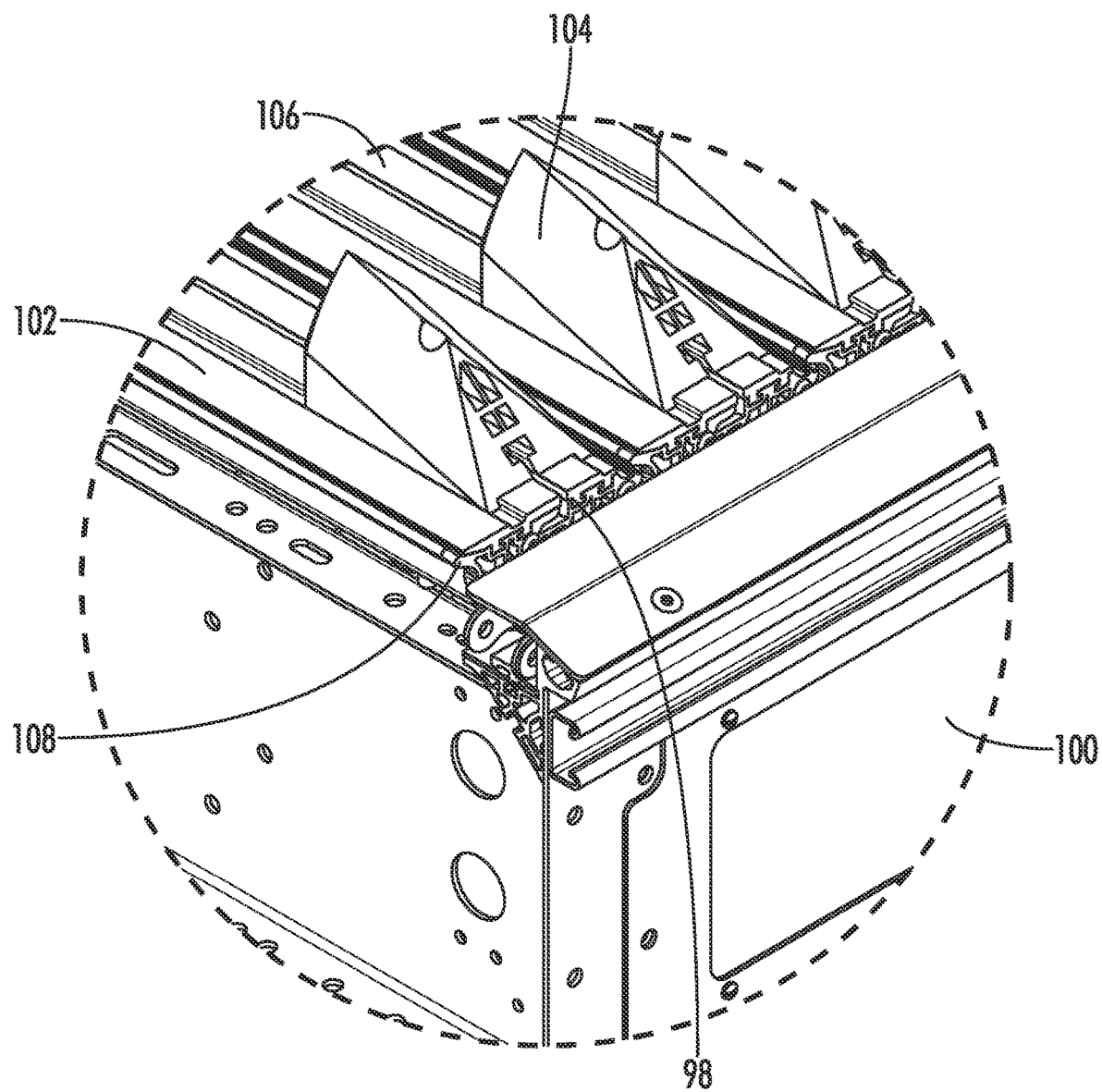
FIG. 2 is an environmental view thereof.

FIG. 2 shows the sorter 104 positioned on the slat 108 with an upper conveying surface 106. The slats convey objects longitudinally. The sorters 104 pass laterally over the slats to divert articles laterally across the slats. The sorting track 98 located between the front edge and the rear edge of the slat 108 of one embodiment provides a track for the sorter 104 to travel. In another embodiment, the sorter travels between two separate slats.

Figure 3:
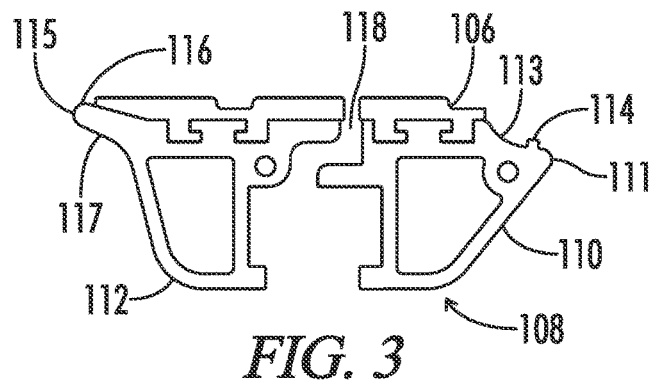
FIG. 3 is a sectional left side view thereof.
Figure 4:
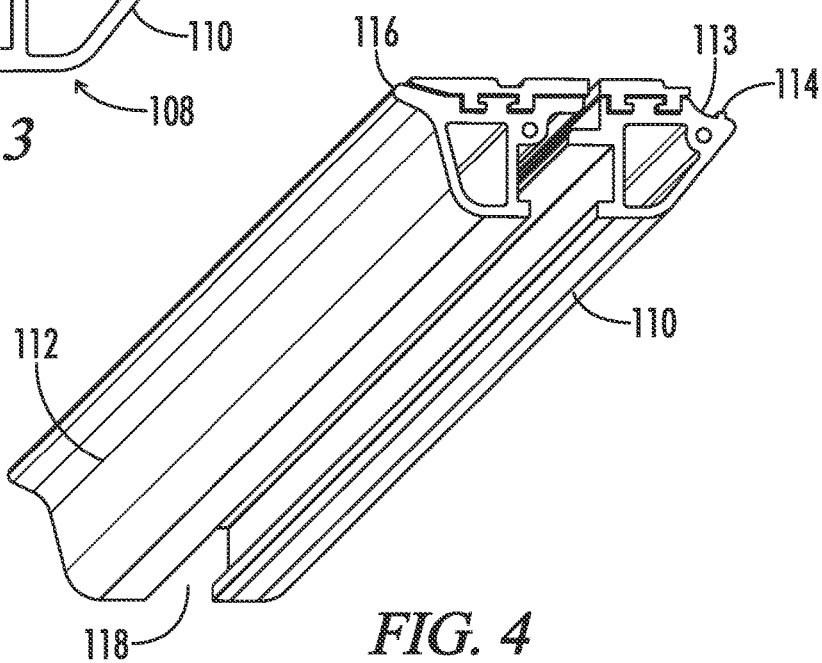
FIG. 4 is a sectional bottom perspective view thereof.
Figure 5:
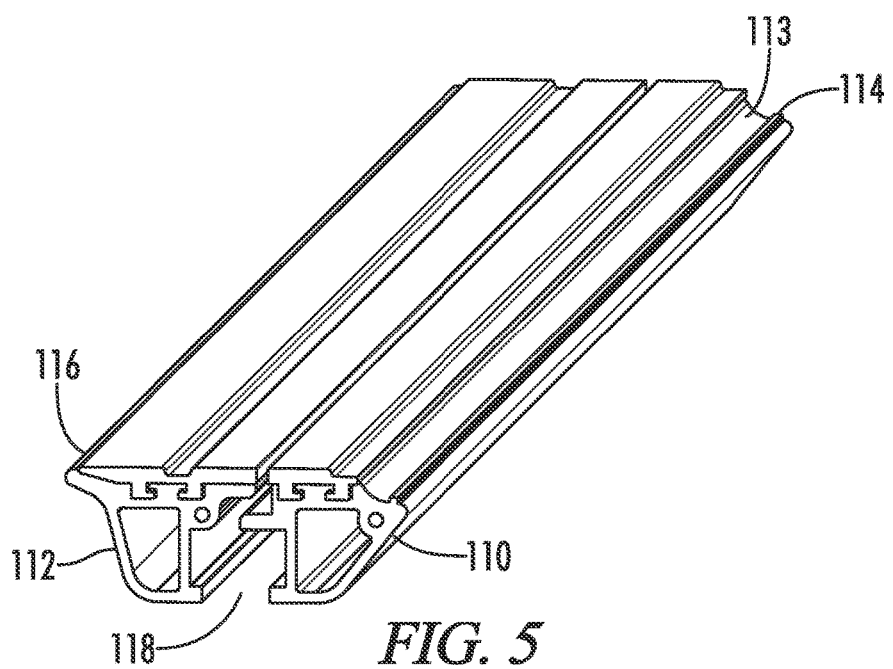
FIG. 5 is a sectional top perspective view thereof.
Figure 6:
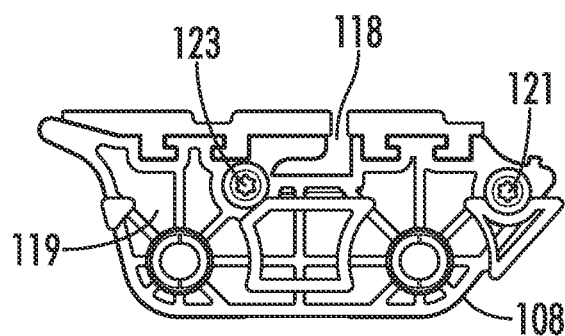
FIG. 6 is a left side view thereof, the right side view being a mirror image of the left side view.
Figure 7:
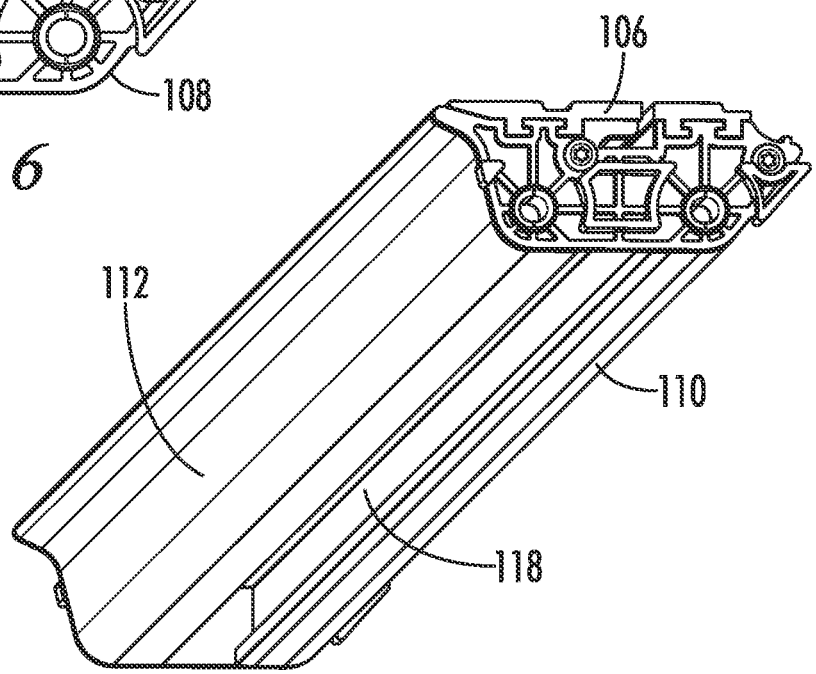
FIG. 7 is a bottom perspective view thereof.
Figure 8:
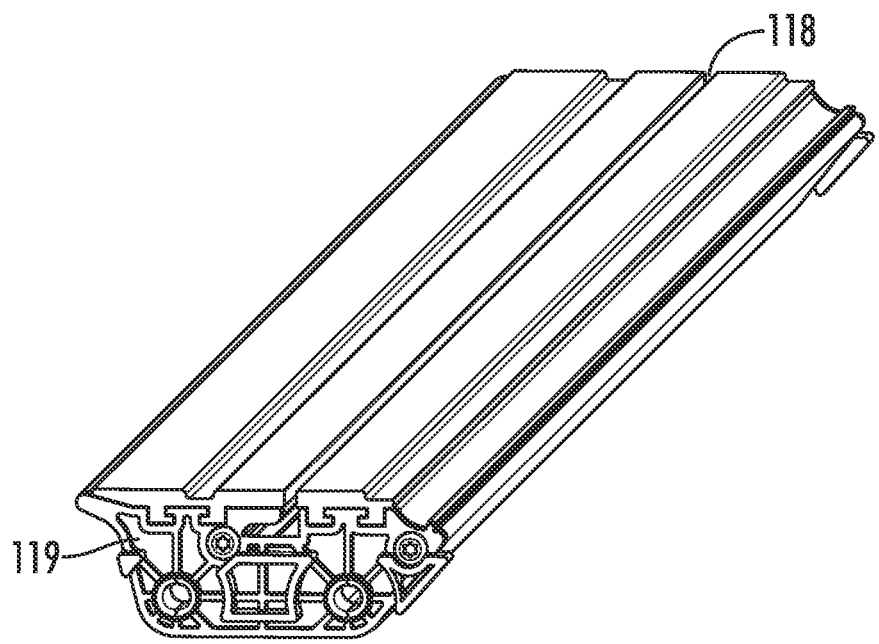
FIG. 8 is a top perspective view thereof.

FIGS. 3-5 show sectional views of the slat 108 constructed from two components, a lead component 110 and a tail component 112. The lead component 110 attaches to the tail component 112 to form the sorting aperture 118 through which the sorter travels. The sorter of one embodiment travels laterally between the front edge 111 and a rear edge 115 of a single slat. The sorter also travels laterally between the retention lip 114 and the retention tail 116.

Each of the slats 108 has an upper conveying surface 106 for conveying articles and a front edge 111 and a rear edge 115. The front edge 111 and rear edge 115 are located longitudinally apart from each other. The shoe transfers articles laterally across the slats 108. The front edge 111 and the rear edge 115 are located at different vertical heights to create overlap between adjacent slats to decrease the size of the gap between the slats. The front edge 111 and the rear edge 115 extend longitudinally from the conveying surface 106. The front edge 111 extends longitudinally from the conveying surface 106 to form a retention curve. The retention curve extends from the conveying surface downward to the lower edge.

An upper conveying surface 106 secures to the slat 108. The sorting aperture 118 in the upper conveying surface 106 creates the travel path of the sorter extending laterally across the conveyor and the upper conveying surface 106. The upper conveying surface of one embodiment is constructed from two separate components applied to the lead component 110 and the tail component 112.

The upper surface of the slat from the conveying surface 106 extending longitudinally forward to the front edge 111 curves downward to the front edge 111 to form the retention curve 113. The lower surface 117 of the retention tail 116 extending longitudinally forward from the rear edge 115 towards the front edge 111 curves downward. The curves may be reversed depending upon which edge, the front or rear, is positioned vertically above the other. The lower edge positioned vertically below the upper edge has an upper surface that curves downward from the conveying surface to the lower edge. The upper edge positioned vertically above the lower edge has a lower surface that curves downward from the upper edge longitudinally towards the lower edge.

Figure 9:
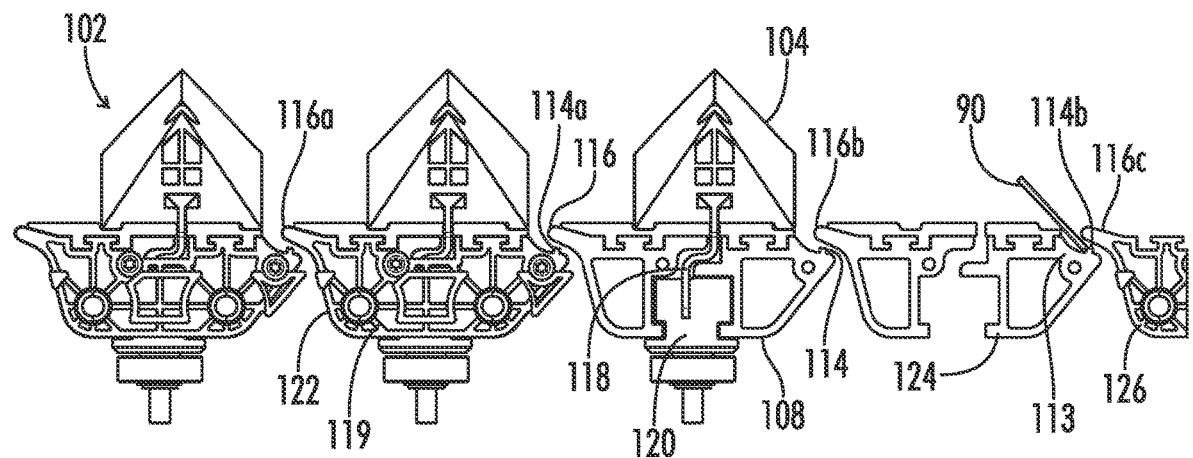
FIG. 9 is an environmental view thereof.
Figure 10:
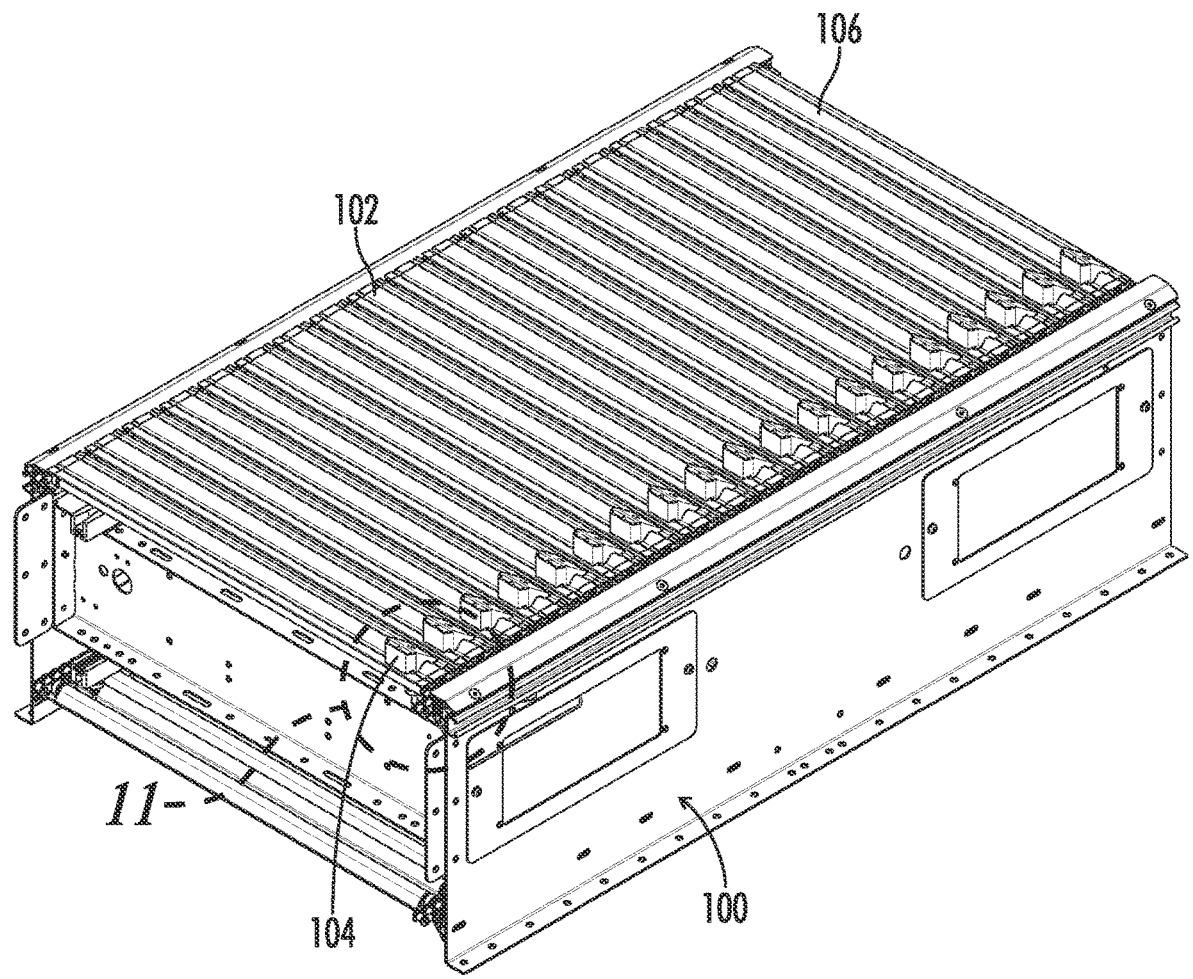
FIG. 10 is an environmental view of one embodiment of the present invention.
Figure 11:
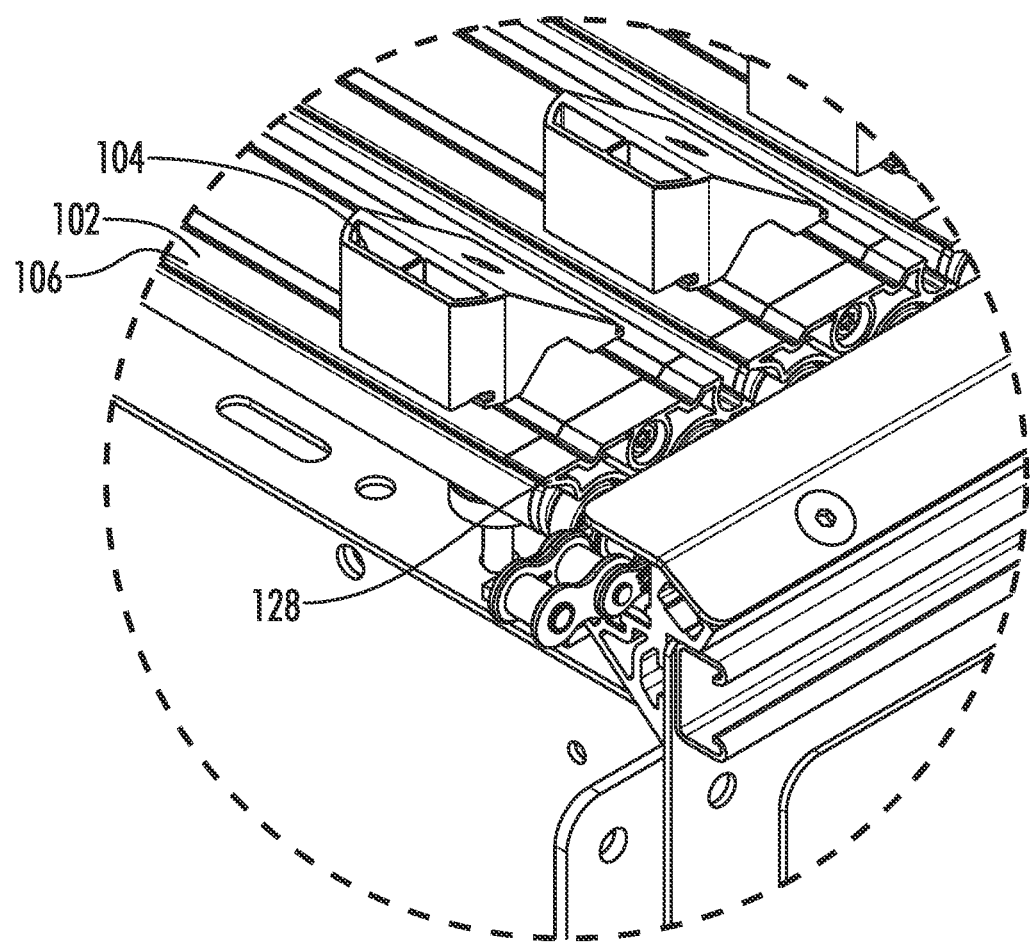
FIG. 11 is an environmental view thereof.
Figure 12:
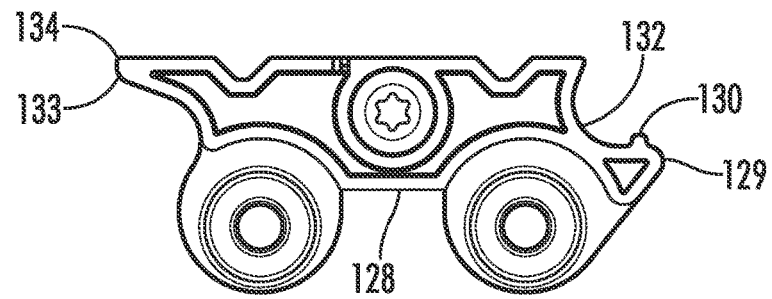
FIG. 12 is a left side view thereof, the right side view being a mirror image of the left side view.
Figure 13:
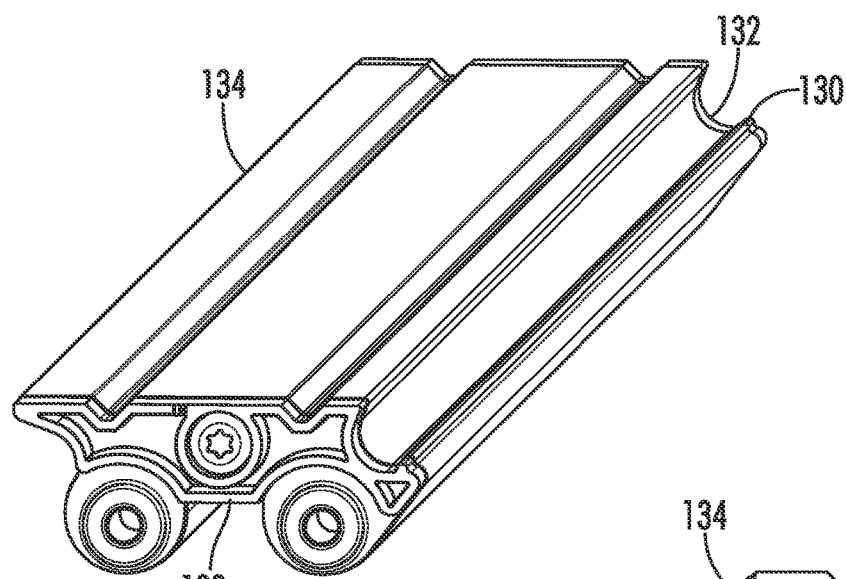
FIG. 13 is a top perspective view thereof.
Figure 14:
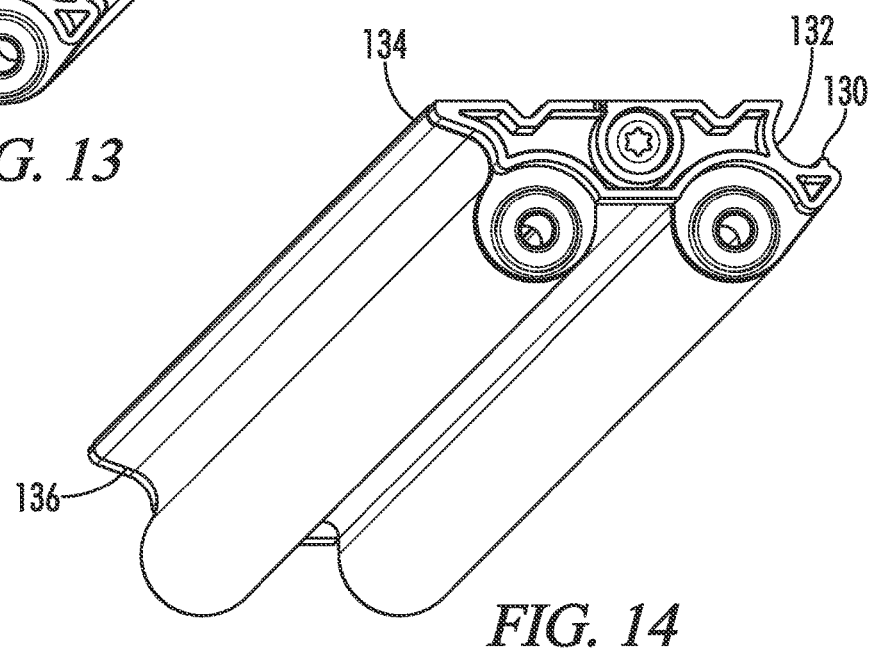
FIG. 14 is a bottom perspective view thereof.

The curves at the front edge and the rear edge create overlap of the adjacent slats as shown in FIG. 9. The overlap of the adjacent slats reduces spacing between the slats. Such reduced spacing limits the number of articles that slip between the slats as discussed below.

A retention lip 114 provides an additional surface that limits articles from passing between the slats. The retention lip 114 extends upward between the lower edge, such as the front edge 115, and the conveying surface 106. The retention lip 114 extends upward. However, the retention lip 114 is positioned below the upper edge, such as the rear edge 115. In one embodiment, the retention lip 114 is positioned between the lower edge, such as the front edge 111, and the conveying surface 106. The retention lip 114 traps articles within the retention curve 113 between the retention lip 114 and the conveying surface 106 as shown in FIG. 9.

FIGS. 6-9 show the attachment body 119 that secures the lead component 110 with the tail component 112 shown in FIGS. 3-5. Fasteners 121, 123 through the attachment body 119 secure the lead component 110 with the tail component 112 to form the slat 108. In one embodiment, attachment bodies 119 located on each end of the slat secure the lead and tail component to each other.

The attachment body 119 attaches the components to provide the sorting aperture 118. The sorting aperture 118 extends from the top to the bottom of the slat 108 to allow for movement of the sorter through sorting track 98 shown in FIG. 2.

FIG. 9 shows the conveyor 102 formed by multiple slats, such as slats 108, 122, 124, 126 connected. The side view of the conveyor 102 in FIG. 9 shows the overlap of the adjacent slats, such as slats 122, 108, 124, 126. Retention lip 114a is positioned vertically below the retention tail 116. Similarly, retention lip 114 is positioned vertically below retention tail 116b. Retention lip 114b is positioned vertically below retention tail 116c.

The adjacent slats, such as slats 122, 108, slats 108, 124, and slats 124, 126 overlap at the front edge of the tailing slat and the rear edge of the leading slat. The retention lip is positioned longitudinally in front of the rear edge of the leading slat. Such overlap limits articles, such as article 90, from falling between the spacing between the slats, such as slats 124, 126.

The edges of the slats are located at different heights on the conveyor 102 to form an upper edge and a lower edge. In one embodiment, the front edge is located below the rear edge. In another embodiment, the front edge is located above the rear edge. Such placement of the edges at different heights creates the overlap that reduces the gap between adjacent slats.

FIGS. 10-15 show another embodiment of the parcel sorting system 100 having a smaller slat for the conveyor 102. The sorters 104 travel laterally across the conveying surface 106 to divert articles off of the conveyor 102.

Figure 15:
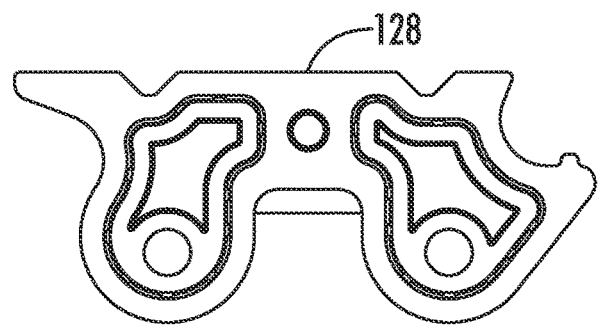
FIG. 15 is a left side sectional view thereof.
Figure 16:
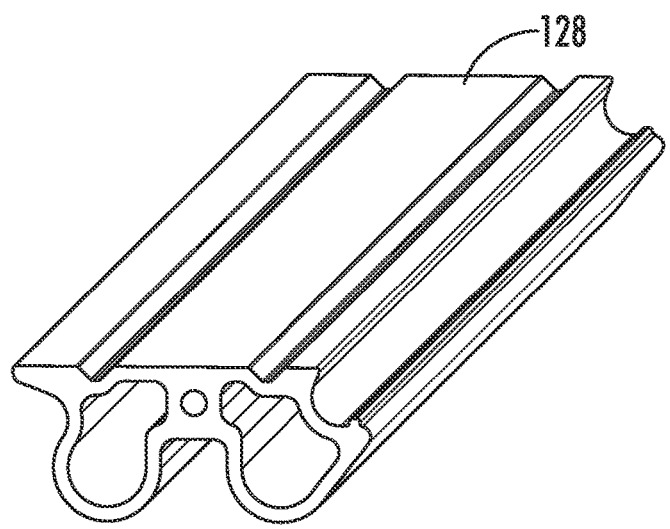
FIG. 16 is a top perspective sectional view thereof.
Figure 17:
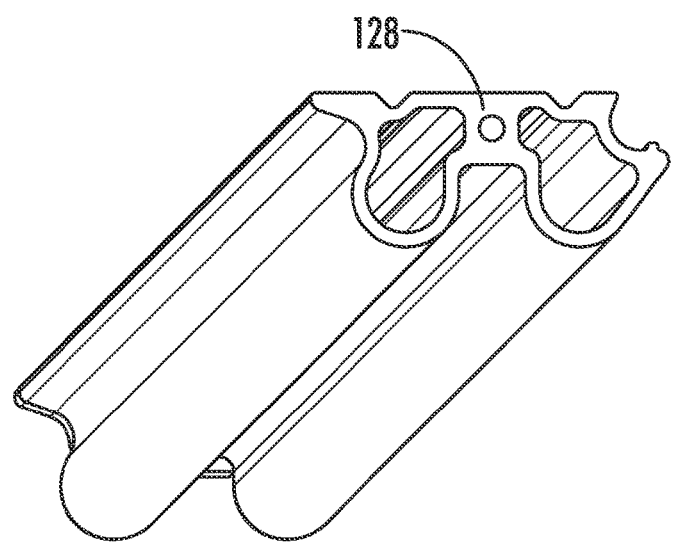
FIG. 17 is a bottom perspective sectional view thereof.

FIGS. 11-17 show more detailed views of the sorter 104 on the slat 128 of the conveyor 102. The front edge and rear edge of slat 128 are constructed from a single, unitary component as shown in FIGS. 15-17. The sorter 104 travels adjacent the edge of the slat 128, such as front edge 129 or rear edge 133. The front edge of one embodiment is the lower edge. The rear edge 133 is the upper edge. The edges of the slat 128 positioned at different vertical heights create overlap between the adjacent slats. An upper surface of the slat 128 forms the conveying surface 106. The lower edge is positioned below the conveying surface 106. A retention curve 132 curves downward from the conveying surface 106 to the retention lip 130. The retention lip 130 is positioned below the conveying surface 103, the upper edge, the rear edge 133, and the retention tail 134.

The retention tail 134 is located at the upper edge of one embodiment of the slat 128. The rear edge 133 of such an embodiment is the upper edge. The lower surface 136 of the retention tail 134 provides a curve that overlaps the retention lip 130 of the adjacent slat as shown in FIG. 18.

The upper edge and the lower edge of one embodiment may be reversed such that the front edge is the upper edge and the rear edge is the lower edge. The retention lip and retention curve are located between the lower edge and the conveying surface. The upper surface of the slat extending longitudinally from the conveying surface curves downward to the lower edge. The lower surface of the slat extending longitudinally from the upper edge curves downward from the upper edge towards the lower edge.

Figure 18:
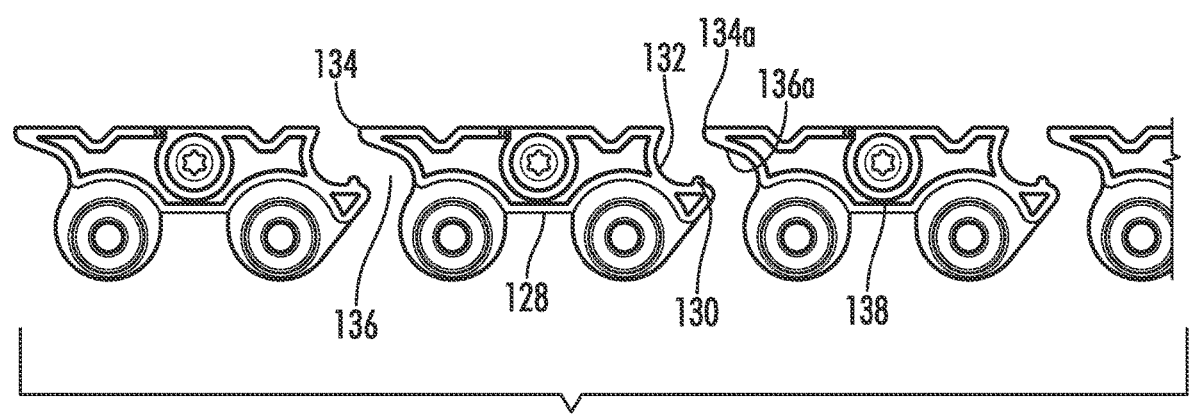
FIG. 18 is an environmental view thereof.

FIG. 18 shows the adjacent slats 128, 138. The front edge of slat 128 is located below the rear edge of slat 138. The retention lip 130 of slat 128 is positioned below the retention tail 134a of slat 138. The upper edge and lower edge provided by the rear edge 133 and the front edge 129 enable overlap of the adjacent slaps. Such overlap reduces the spacing between adjacent slats, such as slats 128, 138, to limit articles from falling between the spacing between the slats.

The slats may be constructed from a single component or multiple components. The slats extend longitudinally allowing the sorter to travel laterally across the conveying surface of the slats. The sorters may travel through a central area of the slats. In another embodiment, the sorts may travel adjacent the front edge and the rear edge of adjacent slats. The slats may be sized according to the articles conveyed by the conveyor.

The embodiment constructed from a single component may be configured to convey smaller articles. The embodiment constructed from multiple components may be configured to convey larger articles and articles of varying shapes.

From the foregoing, it will be seen that the present invention is one well adapted to obtain all the ends and objects herein set forth, together with other advantages which are inherent to the structure.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

What is claimed is:

1. A parcel sorting device configured to convey parcel along a longitudinal axis from a first location to a second location wherein a shoe contacts the parcel to transfer the parcel laterally, the device comprising:
   a slat body that conveys the parcel, wherein the shoe passes laterally above the slat;
   a first edge of the slat body that extends laterally along the slat body;
   a second edge of the slat body that extends laterally along the slat body, wherein the second edge is positioned longitudinally away from the first edge, wherein the first edge and the second edge are located at different vertical heights;
   a conveying surface located longitudinally between the first edge and the second edge;
   a retention lip located longitudinally between the first edge and the conveying surface, wherein the retention lip extends vertically upwards; and
   a sorting aperture located between the first edge and the second edge wherein the sorting aperture passes through the conveying surface, wherein the shoe travels along the sorting aperture.

2. The device of claim 1 further comprising:
   a lead component on which the first edge, retention lip, and retention curve are located;
   a tail component on which the second edge is located, wherein the lead component is located in front of the tail component,
   the sorting aperture separating the lead component from the tail component.

3. The device of claim 2 wherein the conveying surface is located on both the lead component and the tail component.

4. A parcel sorting device configured to convey parcel along a longitudinal axis from a first location to a second location wherein a shoe contacts the parcel to transfer the parcel laterally, the device comprising:
   a slat body that conveys the parcel, wherein the shoe passes laterally above the slat;
   a front edge of the slat body that extends laterally along the slat body;
   a rear edge of the slat body that extends laterally along the slat body, wherein the rear edge is positioned longitudinally away from the front edge, wherein the front edge and the rear edge are located at different vertical heights;

a conveying surface located longitudinally between the front edge and the rear edge;

a retention lip located longitudinally between the front edge and the conveying surface, wherein the retention lip extends vertically upwards;

wherein the front edge is located vertically below the rear edge;

wherein the retention lip is located vertically below the rear edge;

a retention curve extending longitudinally between the conveying surface and the retention lip, wherein the retention curve curves longitudinally downward from the conveying surface to the retention lip;

wherein the retention lip is located longitudinally behind the front edge;

a retention tail located at the rear edge;

a bottom surface of the retention tail that curves longitudinally downward from the rear edge towards the front edge;

a sorting aperture located between the front edge and the rear edge wherein the sorting aperture passes through the conveying surface, wherein the shoe travels along the sorting aperture.

5. The device of claim 4 further comprising:

a lead component on which the front edge, retention lip, and retention curve are located;

a tail component on which the rear edge is located, wherein the lead component is located in front of the tail component, the sorting aperture separating the lead component from the tail component;

wherein the conveying surface is located on both the lead component and the tail component.

6. A parcel sorting device configured to convey parcel on a conveyor along a longitudinal axis from a first location to a second location wherein a shoe contacts the parcel to transfer the parcel laterally, the device comprising:

a slat body that conveys the parcel, wherein the shoe passes laterally above the slat;

a front edge of the slat body that extends laterally along the slat body;

a rear edge of the slat body that extends laterally along the slat body, wherein the rear edge is positioned longitudinally away from the front edge, wherein the front edge is located vertically below the rear edge;

a conveying surface located longitudinally between the front edge and the rear edge;

a retention lip located longitudinally between the front edge and the conveying surface, wherein the retention lip extends vertically upwards above the front edge, wherein the retention lip is located vertically below the rear edge;

a sorting aperture located between the front edge and the rear edge wherein the sorting aperture passes through the conveying surface, wherein the shoe travels laterally along the sorting aperture, wherein the shoe travels between the front edge and the rear edge;

a lead component on which the front edge, retention lip, and retention curve are located;

a tail component on which the rear edge is located, wherein the lead component is located in front of the tail component, the sorting aperture separating the lead component from the tail component;

wherein the conveying surface is located on both the lead component and the tail component.

7. A parcel sorting device configured to convey parcel on a conveyor along a longitudinal axis from a first location to a second location wherein a shoe contacts the parcel to transfer the parcel laterally, the device comprising:

a slat body that conveys the parcel, wherein the shoe passes laterally above the slat body;

a front edge of the slat body that extends laterally along the slat body;

a rear edge of the slat body that extends laterally along the slat body, wherein the rear edge is positioned longitudinally away from the front edge, wherein the front edge is located vertically below the rear edge;

a conveying surface located longitudinally between the front edge and the rear edge;

a retention lip located longitudinally between the front edge and the conveying surface, wherein the retention lip extends vertically upwards above the front edge, wherein the retention lip is located vertically below the rear edge; and a second slat body connected to the conveyor, wherein the shoe travels adjacent the slat body between the slat body and the second slat body.

* * * * *